(12) United States Patent
Wulff

(10) Patent No.: US 7,959,084 B2
(45) Date of Patent: Jun. 14, 2011

(54) MULTI-FUNCTIONAL MOBILE COMPUTING DEVICE UTILIZING A REMOVABLE PROCESSOR MODULE

(75) Inventor: Thomas E. Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/179,049

(22) Filed: Jul. 24, 2008

(65) Prior Publication Data
US 2010/0001076 A1    Jan. 7, 2010

Related U.S. Application Data

(60) Provisional application No. 61/077,387, filed on Jul. 1, 2008.

(51) Int. Cl.
*G06K 7/10* (2006.01)
(52) U.S. Cl. ............................ 235/472.02; 455/575.2
(58) Field of Classification Search ............ 235/462.01–235/462.49, 472.01, 472.02, 439; 455/569.1, 455/575.2, 41.2, 550.1, 575.1, 557, 90.3, 455/349, 556.1, 556.2, 566; 381/370, 376, 381/362, 367; D14/223
See application file for complete search history.

(56) References Cited

U.S. PATENT DOCUMENTS

| | | | | |
|---|---|---|---|---|
| 5,382,784 A | * | 1/1995 | Eberhardt | 235/462.46 |
| 5,392,150 A | * | 2/1995 | Inagaki et al. | 359/221.1 |
| 5,677,834 A | * | 10/1997 | Mooneyham | 700/83 |
| 6,115,616 A | * | 9/2000 | Halperin et al. | 455/557 |
| 6,853,293 B2 | * | 2/2005 | Swartz et al. | 340/5.92 |
| 7,054,965 B2 | | 5/2006 | Bell et al. | |
| 7,069,057 B2 | * | 6/2006 | Ishibashi et al. | 455/566 |
| 7,086,596 B2 | * | 8/2006 | Meier et al. | 235/462.25 |
| 7,130,654 B2 | * | 10/2006 | Cho | 455/550.1 |
| 7,508,932 B1 | * | 3/2009 | Bergh | 379/430 |
| 7,552,871 B2 | * | 6/2009 | Ainasoja | 235/385 |
| 2001/0035459 A1 | * | 11/2001 | Komai | 235/462.25 |
| 2003/0163384 A1 | * | 8/2003 | Hendra | 705/26 |
| 2003/0181168 A1 | * | 9/2003 | Herrod et al. | 455/90.3 |
| 2006/0105722 A1 | * | 5/2006 | Kumar | 455/90.3 |
| 2007/0069864 A1 | * | 3/2007 | Bae et al. | 340/10.2 |
| 2007/0183616 A1 | | 8/2007 | Wahl et al. | |
| 2009/0036119 A1 | * | 2/2009 | Smith et al. | 455/432.1 |

FOREIGN PATENT DOCUMENTS

WO    2007092826 A2    8/2007

* cited by examiner

*Primary Examiner* — Michael G Lee
*Assistant Examiner* — Suezu Ellis

(57) ABSTRACT

A system for reading product indicia includes a mobile computing headset and a wearable data-capture accessory. The mobile computing headset preferably includes a removable processing module shaped and sized to be attachable to the wearable data-capture accessory and one or more communication modules to communicate information between the data-capture accessory and existing infrastructure devices. The data-capture accessory includes a product indicia reader and a communication module for transmitting information to and from the mobile headset.

6 Claims, 4 Drawing Sheets

MULTI-FUNCTIONAL MOBILE COMPUTING DEVICE UTILIZING A REMOVABLE PROCESSOR MODULE

CROSS-REFERENCE TO RELATED APPLICATIONS

This application claims the benefit of U.S. Provisional Application No. 61/077,387 filed Jul. 1, 2008, the contents all of which are incorporated herein by reference.

TECHNICAL FIELD

This disclosure relates to a mobile computing device for data capturing.

BACKGROUND

Automatic Identification and Data Capture (AIDC) refers to techniques for automatically identifying objects, collecting data about them, and entering that data into computer systems. Technologies typically considered as part of AIDC include bar codes, Radio Frequency Identification (RFID), biometrics, magnetic stripes, Optical Character Recognition (OCR), and voice recognition.

For example, RFID technology enables businesses to wirelessly capture and move data associated with products or items using radio waves. A typical system includes "tags", each of which include an embedded, unique identifier that is associated with the product or object being moved; "readers" that are designed to decode the data on the tag; and a host system or server that processes and manages a plurality of information gathered.

From the time a product is manufactured to when it is consumed, RFID systems can offer real-time visibility into shipments and inventory in motion. Using radio waves, data is captured and moved wirelessly to and from the point of business activity. The systems utilize the unique identifiers to match information about the product with information from a company's database or host system.

More recently, businesses have begun to use a distributed architecture for the automatic identification of objects in motion on supply chain and industrial production applications. Typically, these distributed architectures utilize Electronic Product Code (EPC) technology with RFID devices. Using EPC technology, a globally unique number is assigned to the RFID device assigned to each tagged product or item. This number is then used to identify the object and to retrieve further information about it through Internet based applications (e.g., using Web services). Additional information concerning the object is not stored on the RFID tag, but instead supplied by distributed servers typically accessible over the Internet.

As AIDC technologies continue to be deployed in the marketplace, there remains a need to further leverage these technologies in enterprise-level deployments across various industries.

SUMMARY

A system and techniques for reading product indicia is disclosed. The system includes a mobile computing headset and a wearable data-capture accessory. The mobile computing headset preferably includes a removable processing module shaped and sized to be attachable to the wearable data-capture accessory and one or more communication modules to communicate information between the data-capture accessory and existing infrastructure devices. The data-capture accessory includes a product indicia reader and a communication module for transmitting information to and from the mobile headset.

Various aspects of the system relate to identifying and reading product indicia. For example, according to one aspect, a system for reading product indicia includes a data-capture accessory including a product indicia reader and a first communication module capable of receiving and sending radio communications. The system also includes a support device including a removable processing module shaped and sized for attachment to the data-capture accessory. The processing module includes a second communication module capable of receiving and sending radio communications to the first communication module.

In one embodiment, the support device is a mobile headset and the product indicia reader is a 2D imager for barcode reading. In another preferred embodiment, the product indicia reader is a ultra-high frequency (UHF) EPC reader. The data-capture accessory also can include a user interface that includes a display window, touch panel, one or more buttons, one or more light-emitting diodes (LEDs), or combinations thereof. The data-capture accessory can be a finger mounted device, a wrist mounted device, or a hand held device. In one embodiment, the data-capture accessory includes a removable chargeable battery pack.

The processing module includes a user interface that can include voice recognition software, activation buttons, status LEDs, or combinations thereof. The processing module of the support device is a removable computing device that includes a CPU and memory. In one preferred embodiment, the memory is configured as random access memory. In another preferred embodiment, the memory is flash memory. In yet another embodiment, the processing module includes a third communication module for communication with an Internet-based network infrastructure using an Internet protocol. Example protocols include 802.11a, 802.11b, and 802.11g. The processing module can also include a removable chargeable battery.

Preferably, the processing module is configured to include voice recognition software capable of translating voice commands to electronic instructions executable by the data-capture accessory. The processing module can also include a noise canceling audio module that can be used to improve voice command recognition.

Several advantages can be derived using the present system. For example, the present system can be utilized with "hands-free" applications for backroom inventory receiving, cart/pallet building and breaking, inventory management and shipping. In addition, as the system can be used in connection with the mobile headset and be voice activated, current hip mounted computer devices and cabled headset as known in the art are not required. Furthermore, as the present system can be voice activated, the system disclosed is non-keypad intensive.

Additional features and advantages will be readily apparent from the following detailed description, the accompanying drawings and claims.

BRIEF DESCRIPTION OF THE DRAWINGS

Like reference symbols in the various drawings indicate like elements.

DETAILED DESCRIPTION

Figure 1:
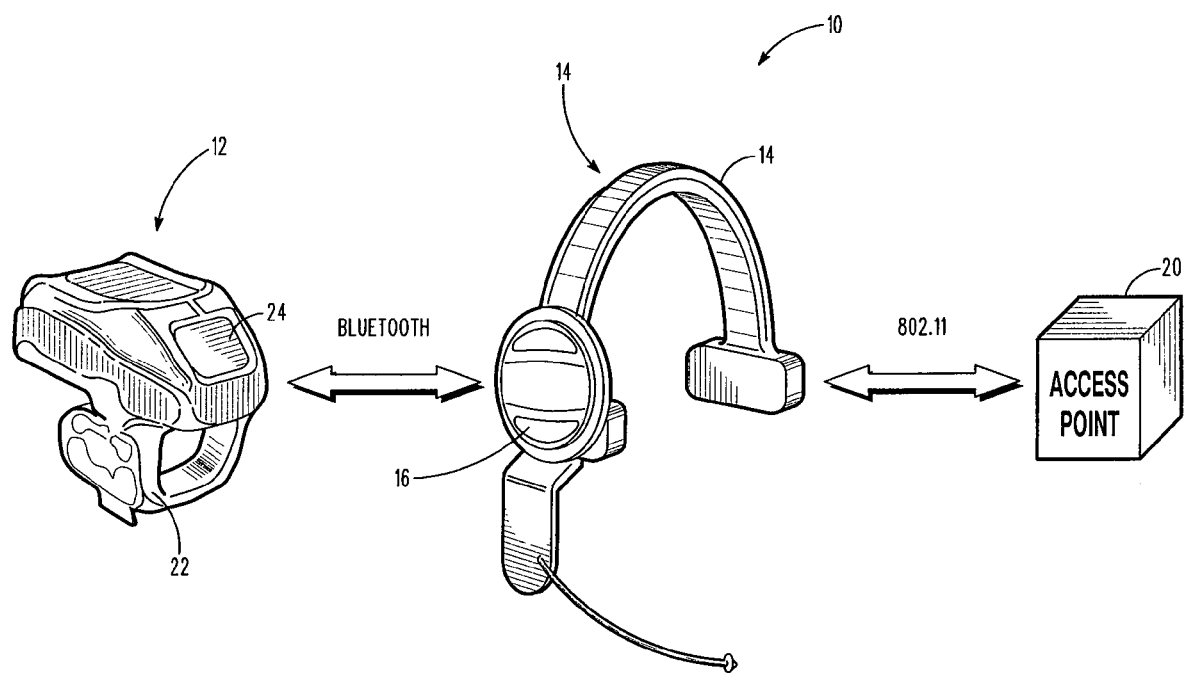
FIG. 1 illustrates example components of an EPC data capturing system according to the present invention.

Referring to FIG. 1, an example of a computer-based system 10 for reading product indicia is disclosed. The system 10 includes a data-capture accessory 12 that includes a product indicia reader for reading product data. In one preferred embodiment, the product indicia reader is an EPC reader for reading EPC data included on tagged items. The data-capture accessory 12 also includes a first communication module capable of receiving and sending radio communications. For example, in one preferred embodiment, the first communication module is configured to send and receive radio signals using Bluetooth technology. Of course, it will be appreciated by one skilled in the art that other technologies that utilize radio signals may be utilized by the first communication module.

In one preferred embodiment, as shown in FIG. 1, the system 10 includes a support device, such as a mobile headset 14. The mobile headset 14 includes a removably coupled processing module 16 and a microphone for receiving voice commands. The removably coupled processing module 16 can be detached from the headset 14. Preferably, the processing module 16 is shaped and sized for attachment to the data-capture accessory 12. The processing module 16 also can include a second communication module capable of receiving and sending radio communications to the first communication module included in the data-capture accessory 12. Although a mobile headset is shown and discussed throughout this disclosure, it will be appreciated by one skilled in the art that other types of support devices can be used with the processing module of the present invention. The data-capture accessory 12 can be a fix-mounted device, hand-held device, and a hands-free device. Additional details of components included in the processing module 16 and data-capture accessory 12 are discussed in connection with FIGS. 3 and 4 of the disclosure.

Advantageously, the system 10 can be configured as a hands-free EPC product system for identifying the location of EPC tagged items. For example, the system 10 can be used to identify the location of EPC tagged merchandise in backroom storage locations. Preferably, the processing module 16 of the mobile handset 14 is configured as a "thick client" that provides fully functional mobile computing capability. As such, the processing module 16 of the present invention includes all the necessary software required to operate the data-capture accessory 12.

As shown in FIG. 1, the system 10 preferably includes at least one Wireless Access Point (WAP) 20 that provides connectivity between a wide area network and the processing module 16. For example, in one preferred embodiment, the processing module communicates with the WAP 20 using an 802.11-compliant network protocol. Of course, it will be appreciated that the WAP 20 can also be configured to support a cellular digital packet data (CDPD) network, high speed circuit switched data (HSCSD) network, packet data cellular (PDC-P) network, general packet radio service (GPRS) network, 1× radio transmission technology (1×RTT) network, IrDA network, multichannel multipoint distribution service (MMDS) network, local multipoint distribution service (LMDS) network, worldwide interoperability for microwave access (WiMAX) network, and/or any other network that communicates using a wireless protocol.

Advantageously, the processing module 16 of the present invention can provide voice communications amongst mobile workers using VoIP as well as provide uni-cast and multi-cast broadcasting capabilities of information between workers.

Figure 2:
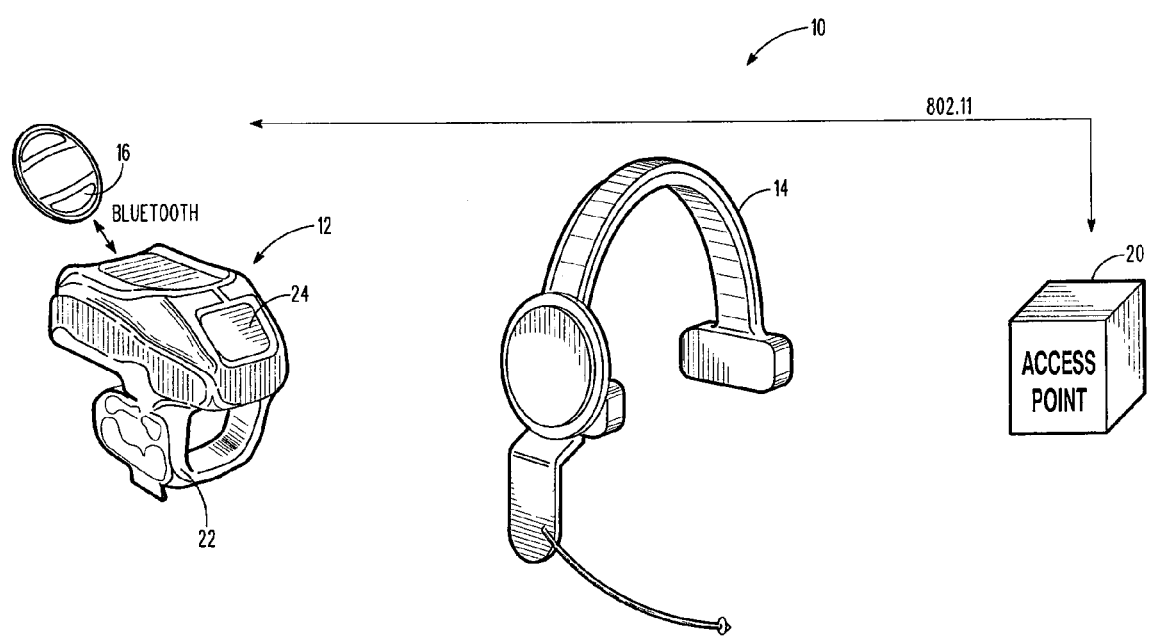
FIG. 2 illustrates a removable processing module included in the system of FIG. 1.

Turning now to FIG. 2, the processing module 16 of the headset 14 can be advantageously decoupled from the mobile headset 14. As shown in FIG. 2, in one preferred embodiment, for example, the processing module 16 can be attached to the data-capture accessory 12 thus providing the data-capture accessory 12 with full thick client mobile computing capabilities.

Figure 3:
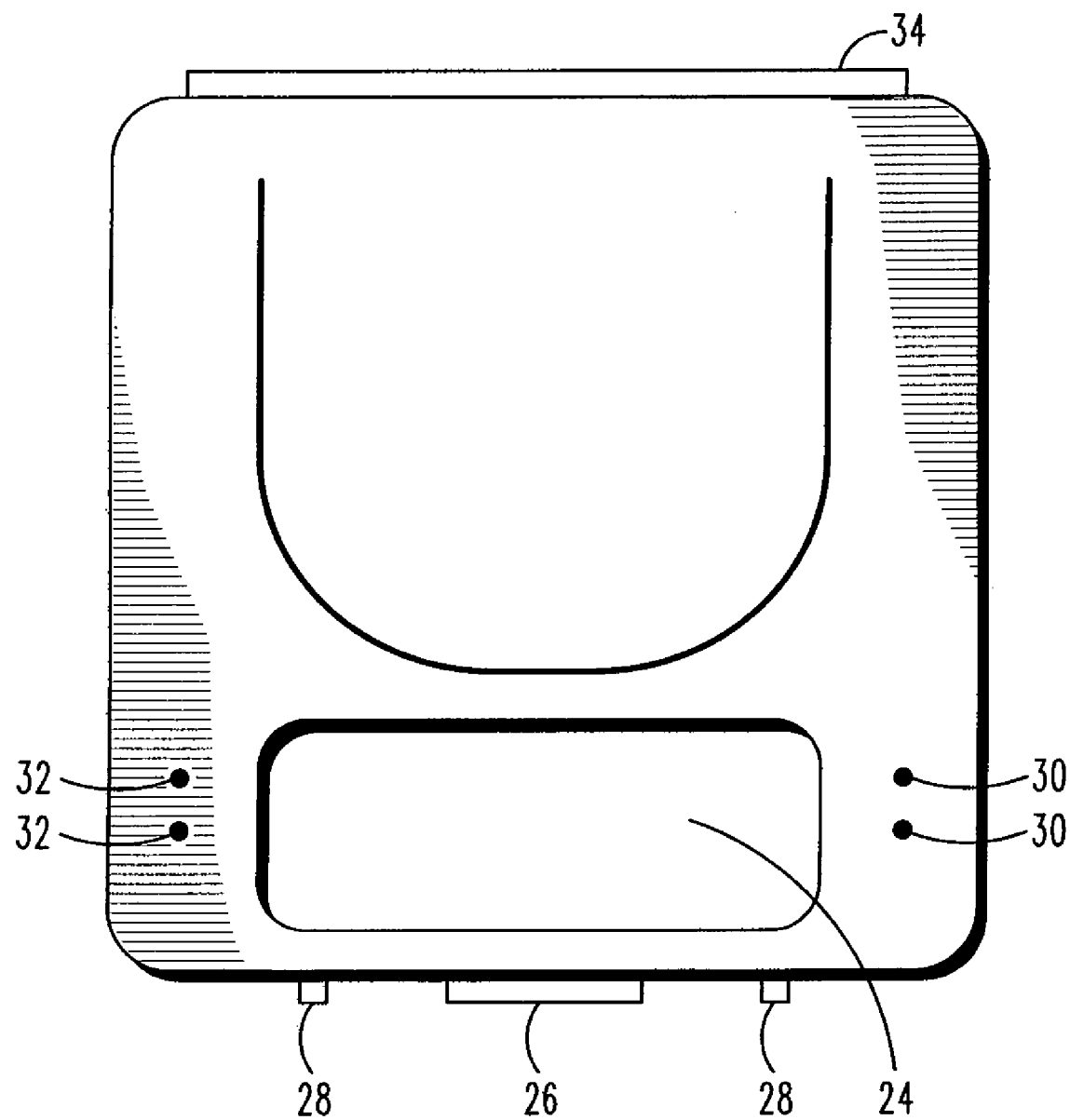
FIG. 3 is a schematic of an exemplary data-capture accessory according to the present invention.

Referring now to FIGS. 1 and 3, details of the data-capture accessory 12 will now be explained. The data-capture accessory 12 can be a ring mounted device, a wrist mounted device 22, or alternatively a hand-held or fixed mounted device. In one preferred embodiment, the data-capture accessory 12 includes a 2D imager 28 for barcode reading, a UHF EPC reader 26 for reading EPC tagged items, and a radio communication module (not shown) for data communication to the processing module 16. From a user interface (UI) perspective, the data-capture accessory 12 can include a display screen 24 to display new and legacy applications, one or more function buttons 30 to activate the data-capture accessory 12, and one or more light-emitting diodes (LEDs) 32 to display operational status of the accessory 12. Preferably, the data-capture accessory 12 is light weight, formed with a low profile, and operates under control of the processing module 16. In one preferred embodiment, the data-capture assembly 12 also includes a chargeable battery pack 34.

Figure 4:
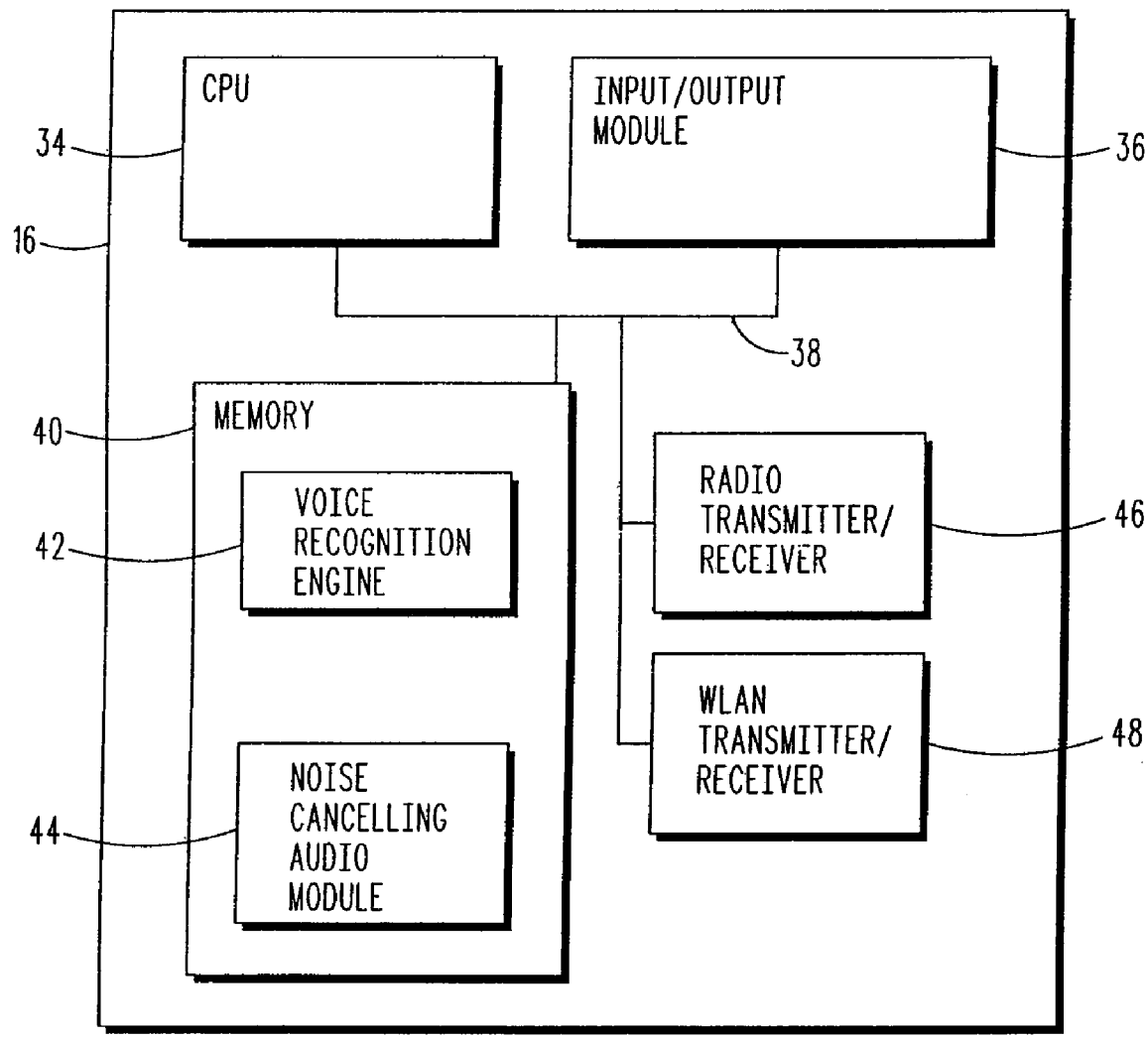
FIG. 4 is a schematic of an exemplary processing module according to the present invention.

Turning now to FIGS. 1 and 4, the processing module 16 of the mobile headset 14 preferably includes a CPU 34, an input-output module 36, memory 40, a transmitter-receiver 46, a WLAN transmitter-receiver 48, I/O physical connections, audio/voice, power supply, and a battery, all of which are interconnected and under control of the CPU 34.

The input-output module 36 of the processing module 16 receives voice commands via the microphone when the processing module 16 is attached to the headset 14 or alternatively through an inboard microphone (not shown) included on the processing module 16. The input-output module 36 also receives user input via a display touch panel, button selections for EPC data-capturing functionality, and controls light-emitting diodes (LEDs) 32 configured on the processing module 16 for providing status indicators.

The memory 40 of the processing module 16 is preferably non-volatile and is configured to include voice recognition software 42 that translates voice commands received from the input-output module 36 into executable instructions for the data-capture accessory 12. For example, in one preferred embodiment, a "Scan" voice command initiates reading of EPC product codes by the data-capture accessory 12. As shown in FIG. 4, in one preferred embodiment, the memory 40 can also include a noise canceling audio module 44 that operates to improve the signal quality of voice commands received from the input-output module 36.

Preferably, the memory 40 of the processing module 16 is configured to include a mobile computing operating system that can be transported to and execute on various types of data-capture accessories. For example, multiple user interfaces (e.g., displays and keypads) with various features (e.g., barcode readers, EPC readers, etc.) can operate with the mobile computer operating system upon receiving the processing module 16 of the present invention, thereby enabling the various UI's with full mobile computing capability.

Examples of various mobile user interfaces that can be used with the processing module 16 include, but are not limited to, displays on forklift readers, small wearable user interfaces, phone sized products, PDA type products. Advantageously, as the processing module 16 can be attached to a multitude of different device types, hardware and software upgrades, modifications, and service calls can be made much more efficiently and simpler.

In one preferred embodiment, attaching the processing module 16 to the data-capture accessory 12 changes the features of the user interface device. For example, in one embodiment when the data-capture accessory 12 is mounted to the wrist and the processing module 16 is not physically attached to the accessory 12, the display shown on the accessory 12 is in landscape mode. When the processing module 16 is attached to accessory 12 and removed from the waist, the accessory 12 operates as a "hand-held" mobile computer, and the display switches to portrait mode. Various other features or preferences can be modified as well.

The processing module 16 preferably communicates with the data-capture accessory 12 using the transmitter-receiver 46. In one preferred embodiment, the transmitter-receiver 46 is configured to include Bluetooth technology to communicate with the data-capture accessory 12. As shown in FIG. 4, the processing module 16 can also communicate with existing computer infrastructure over the WAP 20 using the WLAN transmitter-receiver 48, or a physical I/O connector.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A system for reading product indicia comprising:
  a data-capture accessory comprising a product indicia reader and a first communication module capable of receiving and sending radio communications;
  a support device; and
  a processing module shaped and sized for removable attachment to the data-capture accessory and the support device, the processing module including voice recognition software to translate voice commands that are inputted using the support device when the processing module is attached to the support device, into electronic instructions for execution by the data-capture accessory when the processing module is attached to the data-capture accessory, the processing module including a second communication module capable of receiving and sending radio communications to said first communication module.

2. The system of claim 1, wherein the processing module includes all the necessary software required to operate the data-capture accessory upon attachment of the processing module.

3. The system of claim 1, wherein the processing module includes a processor, an input-output module, memory, a transmitter-receiver 46, and input/output connections, all of which are under control of the processor.

4. The system of claim 1, wherein the support device is a mobile headset.

5. The system of claim 1, wherein the data-capture accessory comprises a user interface and wherein the processing module includes an operating system that can be transported to and execute on the data-capture device to operate that specific user interface.

6. The system of claim 5, wherein the processing module upon attachment to the to the data-capture accessory changes features of the user interface of the data-capture accessory.

* * * * *